United States Patent Office  3,767,588
Patented Oct. 23, 1973

3,767,588
INFRARED-EXCITABLE RARE EARTH OXY-
FLUORIDE LUMINESCENT MATERIALS
Yoshiro Otomo, Mitaka, Hajime Yamamoto, Setagaya,
Masaki Nakano, Hachioji, and Tsuyoshi Kano, Tokyo,
Japan, assignors to Hitachi, Ltd., Tokyo, Japan
Filed Jan. 31, 1972, Ser. No. 222,017
Claims priority, application Japan, Jan. 29, 1971,
46/2,828
Int. Cl. C09k 1/08
U.S. Cl. 252—301.4 H                   12 Claims

ABSTRACT OF THE DISCLOSURE

Oxyfluorides of lanthanum, gadolinium, yttrium and lutetium, activated with erbium, and containing ytterbium as a sensitizer can be efficiently excited to red luminescence by infrared radiation, and can be used in certain light-producing applications and the composition of the oxyfluorides can be represented by the following general formula:

wherein Ln is at least one element selected from the group consisting of lanthanum, gadolinium, yttrium and lutetium, and wherein $x$, $y$ and $z$ are $0.4 \leq x \leq 1.3$, $0.06 \leq y \leq 0.35$ and $0.008 \leq z \leq 0.10$, respectively.

BACKGROUND OF THE INVENTION

The present invention relates to inorganic crystalline luminescent materials. More particularly, it relates to such materials which can be excited to produce red visible radiation by infrared stimulation.

The so-called infrared radiation-to-visible radiation converting phosphor for converting infrared light to visible light, is excited at two stages or three stages by two or three photons of infrared light, respectively, and emits one photon of visible light. A phosphor of high conversion efficiency has recently been developed, and has developed to the stage of being put into practical use in combination with a gallium arsenide light-emitting diode. One phosphor which is known as a typical green phosphor may be represented by the general formula $$LnF_3:Yb,$$

Er wherein Ln is at least one element selected from the group consisting of lanthanum, yttrium, gadolinium and lutetium. A phosphor recognized as being best as a red phosphor is one which comprises rare earth metal oxychlorides as a matrix having ytterbium incorporated as a sensitizer and erbium as an activator. The red phosphor of rare earth metal oxychlorides, however, has a problem in stability, and tends to be deteriorated particularly in an atmosphere of moisture or high humidity. This constitutes a serious disadvantage in practical use. Furthermore, the rare earth metal oxychloride phopshor is comparatively strong in the luminescence of green in addition to that of red, and slightly orange in the color tone. Improvements are desired in this respect.

SUMMARY OF THE INVENTION

It is an object of the present invention to provide an efficient infrared-stimulable, red visible light-emitting luminescent material having a high intensity, clear color tone of red and an excellent degree of moisture-proof.

A further object is to provide a method for producing an efficient infrared-stimulable, red visible light-emitting luminescent material consisting essentially of a rare earth metal oxyfluoride.

Briefly stated, the present invention in certain of its embodiments provides an oxyfluoride of at least one of the metals lanthanum, gadolinium, yttrium and lutetium, activated by erbium and containing sufficient quantities of ytterbium in the matrix to enhance the luminescence of said oxyfluoride in response to excitation by infrared light.

More specifically, the phosphor of the present invention is characterized by having a composition of rare earth metal oxyfluoride which is represented by the general formula:

$$(Ln_{1-y-z}Yb_yEr_z)O_{x/2}F_{3-x}$$

wherein Ln is at least one rare earth element selected from the group consisting of La, Y, Gd and Lu, and $0.4 \leq x \leq 1.6$, $0.06 \leq y \leq 0.35$ and $0.008 \leq z \leq 0.10$. While, as previously stated, the well-known fluoride phosphor $LnF_3:Yb$, Er has excellent characteristics as an infrared-stimulable, green visible light emitting luminescent material, the presence of extremely small quantities of oxygen at the sintering of the phosphor results (as is well known) in remarkably lowering the luminous efficiency. In accordance with this invention it has been found that, if the fluoride phosphor is sintered under suitable oxidizing conditions, an infrared radiation-to-visible radiation converting phosphor may be synthesized which exhibits red light emission of high intensity by infrared stimulation.

For example, as shown in French Pat. No. 2,004,990, a green light-emitting phosphor  is obtained by sintering in an atmosphere of HF, or in an inert gas atmosphere by adding aluminum fluoride $AlF_3$ and ammonium bifluoride $NH_4F \cdot HF$ as a flux. It has been found that, in the case of using $AlF_3$ and $NH_4 \cdot HF$ as the flux, when a small amount of oxygen is mixed into the atmosphere gas, the fluoride is oxidized to turn to the oxyfluoride in a sintering process for a long period of time, whereby an infrared radiation-to-visible radiation converting phosphor being very high in the infrared radiation-to-visible radiation conversion efficiency and excellent in moisture-proof may be obtained under suitable sintering conditions.

More specifically, the first method for producing the phosphor of the present invention comprises mixing 0.06 to 0.35 mole of ytterbium fluoride $YbF_3$, 0.008 to 0.10 mole of erbium fluoride $ErF_3$ and the balance being at least one member selected from the group consisting of lanthanum fluoride $LaF_3$, gadolinium fluoride $GdF_3$, yttrium fluoride $YF_3$ and lutetium fluoride $LuF_3$, so as to be 1 mole in the sum of the mole number of these rare earth fluorides. Subsequently, a fluoride flux containing ammonium bifluoride $NH_4F \cdot HF$ is added to the mixture in an amount of 2 to 50% by weight based on the mixture, and is mixed well. The mixture thus obtained is charged into a crucible, and is subjected to sintering. The sintering atmosphere and sintering conditions at the sintering vary depending upon the configuration of the sintering crucible, the charged amount of the starting material, and the composition as well as the concentration of the flux. For the crucible, one made of platinum is generally used, and since a deep crucible is inferior in the uniformity of characteristics between its upper and lower parts, a crucible which is as flat as possible is preferable. Concerning the atmosphere gas, an inert gas such as argon and nitrogen having a purity at or higher than 99.99% is used. The inert gas is mixed with $10^{-4}$ to $10^{-1}\%$ by mole of oxygen, based on the inert gas, in such a suitable way that a leakage place for allowing an extremely slight contact with external air is provided at a part of a gas feed pipe for supplying the inert gas to the crucible. While the flow rate of the mixture gas thus obtained and the sintering period of time should be determined depending on the ratio between the charged quantity of the starting material fluoride and the quantity of the oxygen mixed into the gas mixture, it is usually appropriate in operation to conduct the sintering at a gas flow rate of about 100 to about 500 cc. per minute at a temperature of about 1,000 to about 1,200° C. for about 30 minutes to about 5 hours. The charged quantity of the starting material fluoride is subject to restriction under such conditions, and is at most 5 g. or so in case where the contact between the atmosphere gas and the starting material is good. Ammonium bifluoride $NH_4F \cdot HF$ in the flux is indispensable for maintaining the suitable oxidizing condition. The flux is not restricted to the mixture consisting of $AlF_3$ and $NH_4F \cdot HF$. The flux may be a mixture of $NH_4F \cdot HF$ with $BeF_3$, $PbF_3$ etc. which is employed in the manufacture of well-known fluoride phosphors, or it may consist singly of $NH_4F \cdot HF$. The amount of the flux used is at about 2 to about 50% by weight on the basis of the rare earth fluorides of the starting materials.

As regards the method of synthesizing oxyfluoride phosphors, in addition to the first mentioned manufacturing method using the oxidation of fluorides as stated above, there is a second manufacturing method in which fluorides and oxides are mixed and sintered. According to this method, an infrared-stimulable, high intensity red light-emitting luminescent material may be provided with good uniformity and in large quantities. More specifically, this method of manufacture comprises weighing as starting materials fluorides and oxides of rare earth elements so that ytterbium (Yb) may be present in an amount of from 0.06–0.35 mole, erbium (Er) in an amount of from 0.008–0.10 mole and the balance being Ln (which represents one of the rare earth elements noted above), so as to be 1 mole in the sum of the mole number of the rare earth elements, and thus preparing the two types of mixtures. That is, the mixture prepared from the fluorides is the first mixture, while that prepared from the oxides is the second mixture. Subsequently, the first and second mixtures are mixed together at a suitable proportion as will be hereinafter described in detail. The phosphor raw material mixture thus obtained is sintered by a method hereinafter described, to obtain the intended phosphor: A fluoride, such as ammonium bifluoride $NH_4F \cdot HF$, capable of generating hydrogen fluoride (HF) gas when heated, is previously packed in the bottom of a crucible (generally, made of platinum). The upper part of the fluoride is covered using a sheet of, e.g., platinum, which is not corroded by hydrogen fluoride. The above-mentioned phosphor raw material is charged on the sheet and has a close lid placed thereon, and is subjected to sintering in an atmosphere of inert gas such as argon and nitrogen.

The sintering temperature may in practice be 1,000° C. to 1,250° C., but a temperature of 1,100° C. to 1,200° C. is preferred in order to attain a high luminous efficiency. For the sintering time period, about 3 to about 8 hours are suitable. The configuration of the platinum crucible used herein, should preferably be of the usual pot shape. It is critical in order to obtain the phosphor of the present invention that, as described above, the phosphor raw material mixture is charged above ammonium bifluoride ($NH_4F \cdot HF$). In case where the charging order is reversed, i.e. where ammonium bifluoride is arranged above the raw material mixture, the composition of anion varies, and the intended phosphor is not obtainable. Therefore, sufficient care should be taken in this respect.

The ammonium bifluoride ($NH_4F \cdot HF$) is indispensable for ejecting air in the crucible. If the amount of bifluoride used is small, a phosphor having a composition that is excessively oxidized will be produced. In contrast, if the amount of bifluoride is too large, a phosphor of a composition being large in the proportion of fluoride will be produced. The upper limit of the amount is naturally prescribed also form the inside volume of the crucible. The appropriate amount of use of $NH_4F \cdot HF$ is 2% to 50% by weight based on the phosphor raw material mixture, and particularly the range of 10% to 20% is preferable. If the raw material mixture and $NH_4F \cdot HF$ are directly mixed to conduct the sintering, the reaction between the oxides in the raw materials and $NH_4F \cdot HF$ will produce a phosphor of a composition having an extremely high proportion of fluoridization. Therefore, the raw material mixture and $NH_4F \cdot HF$ should be separated from each other. To this end, a separator made up of the sheet of platinum as mentioned above may be used. The ratio between fluorine and oxygen in the phosphor of the present invention may be controlled by changing the ratio between the mixed oxides and the mixed fluorides of the raw material. In order to obtain by this manufacturing method a phosphor having the value of $x$ within the preferable range represented by the heretofore described general formula, the mole ratio of the first mixture to the second mixture may be set to be in a range of 0.5 to 3.0 so as to satisfy the values of $y$ and $z$ in the general formula as in the previous description.

With either of the two methods of manufacture as described above, there are provided phosphors which are excited at identical emission spectra and at approximately equal luminous efficiencies by infrared light. In general, when the oxidation is insufficient luminescence of green and that of red are superposed into orange. When the extent of the oxidation is excessive, red light tinged with orange is emitted again, and besides, the luminous efficiency is lowered. The emission spectrum at the insufficient oxidation and that at the excessive oxidation are different.

BRIEF DESCRIPTION OF THE DRAWING

The luminescent materials of this invention will be further understood from the following detailed description and the accompanying drawings wherein:

FIG. 1 is a diagram of characteristic curves of emission spectra, in which curve $a$ corresponds to a phosphor having a composition of $(Y_{0.8}Yb_{0.19}Er_{0.01})F_3$ which is given for comparison, curve $b$ corresponds to a phosphor having a composition of $(Y_{0.8}Yb_{0.19}Er_{0.01})O_{0.55}F_{1.9}$ which is an embodiment of the present invention, and curve $c$ corresponds to a phosphor having a composition of

Figure 2:
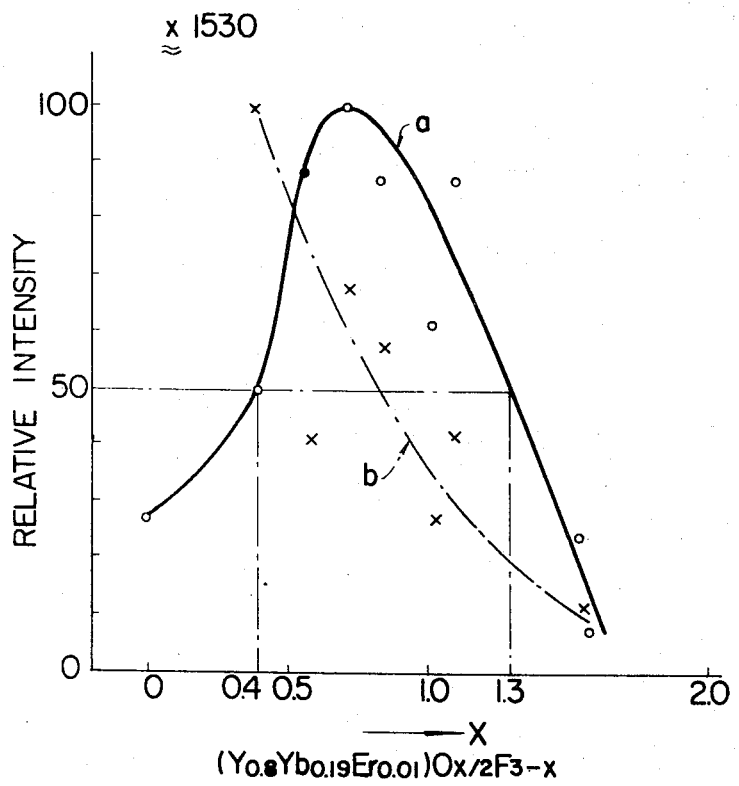

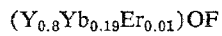
$(Y_{0.8}Yb_{0.19}Er_{0.01})OF$ which falls outside the range of the present invention and is also given for comparison;

FIG. 2 is a characteristic curve diagram showing the relationships between the degree of oxidation and red light-emitting and green light-emitting intensities for oxyfluoride phosphor compositions

Figure 3:
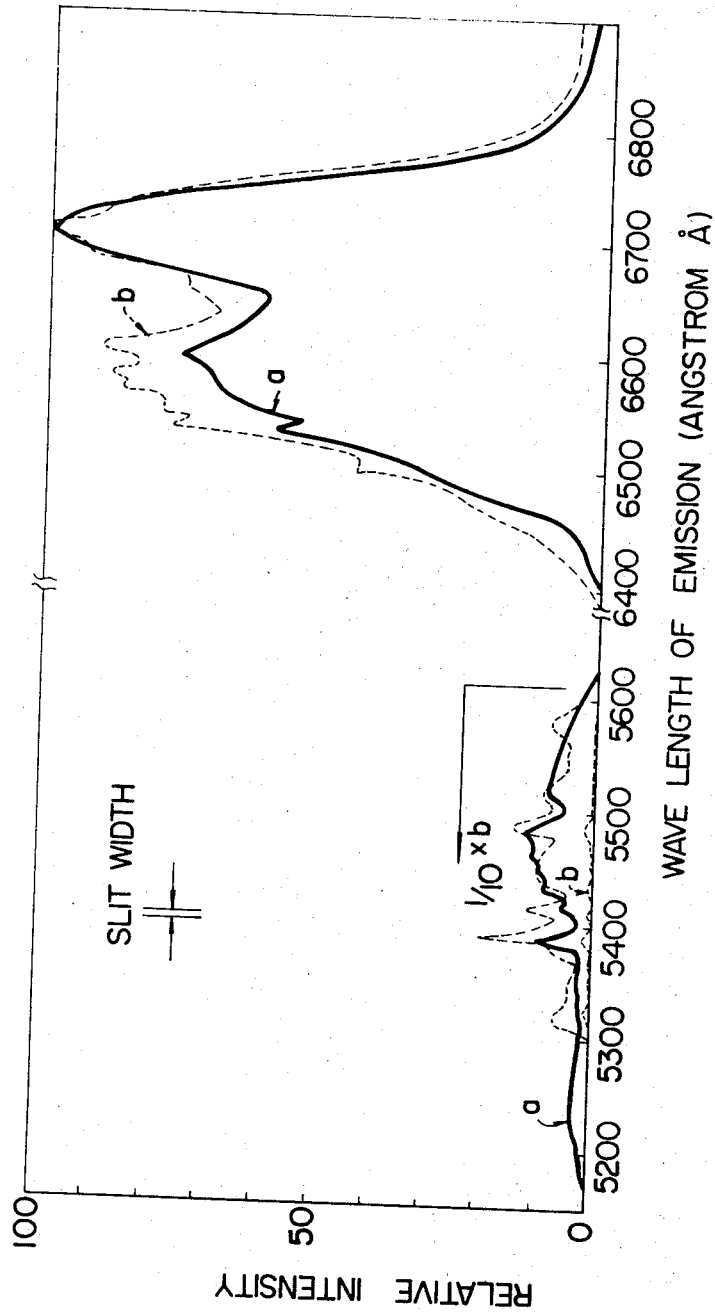

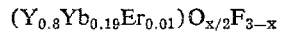
$(Y_{0.8}Yb_{0.19}Er_{0.01})O_{x/2}F_{3-x}$ in which curve $a$ represents the luminescent intensity for red and curve $b$ that for green;

FIG. 3 is a chart of characteristic curves of the emission spectra of phosphors of the present invention, in which curve $a$ corresponds to the phosphor having a composition of $(Y_{0.90}Yb_{0.09}Er_{0.01})O_{0.5}F_{2.0}$ and curve $b$ corresponds to the phosphor having a composition of

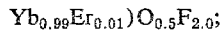
$Yb_{0.99}Er_{0.01})O_{0.5}F_{2.0};$

Figure 4:
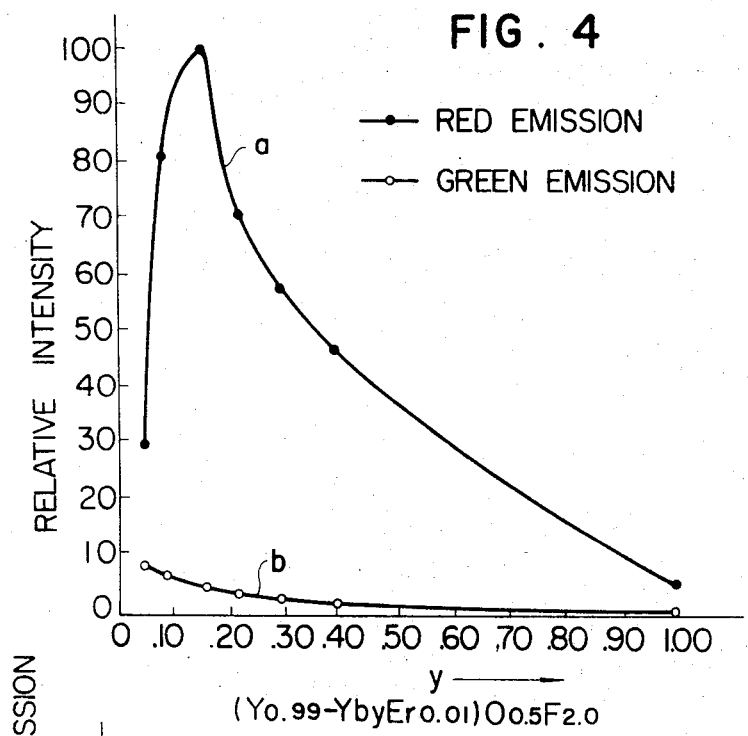
Figure 5:
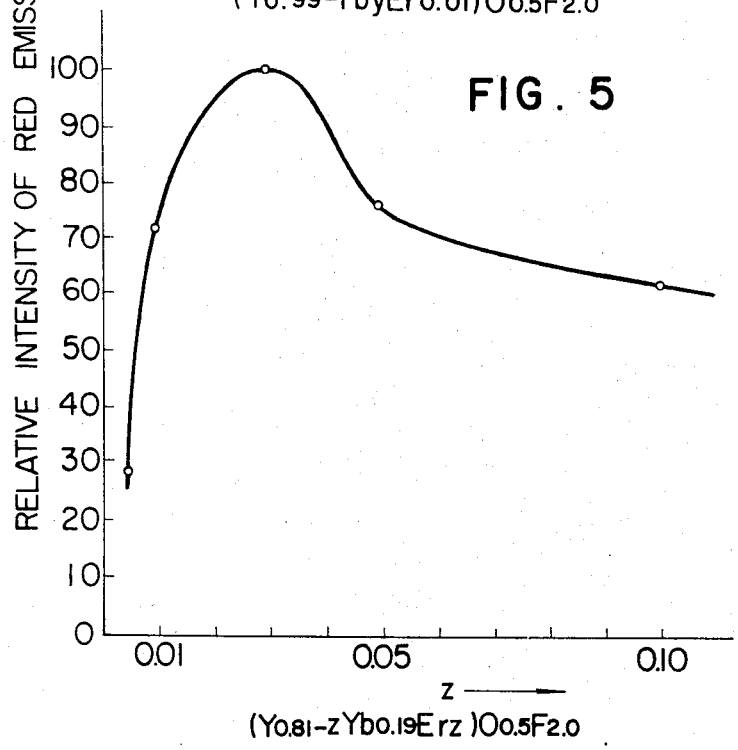

FIG. 4 shows plots of the relationships between the concentration of Yb and red light-emitting and green light-emitting intensities as measured for a phosphor of compositions $(Y_{0.99-y}Yb_yEr_{0.01})O_{0.5}F_{2.0}$ in order to prescribe that concentration of Yb which is excellent in the red light-emitting intensity, in which curve $a$ represents the red luminescent intensity and curve $b$ the green luminescent intensity;

FIG. 5 is a graph of the relationship between the concentration of Er and the intensity of red luminescence as measured for a phosphor of composition

Figure 6:
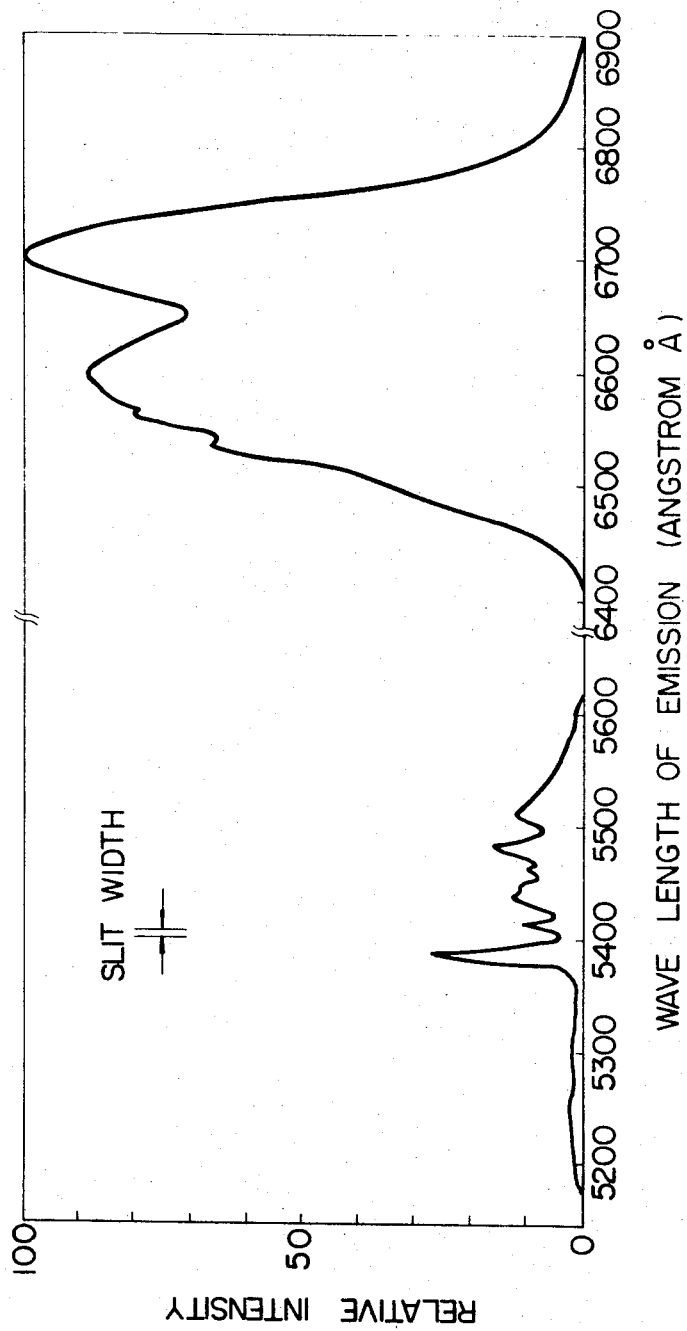
Figure 7:
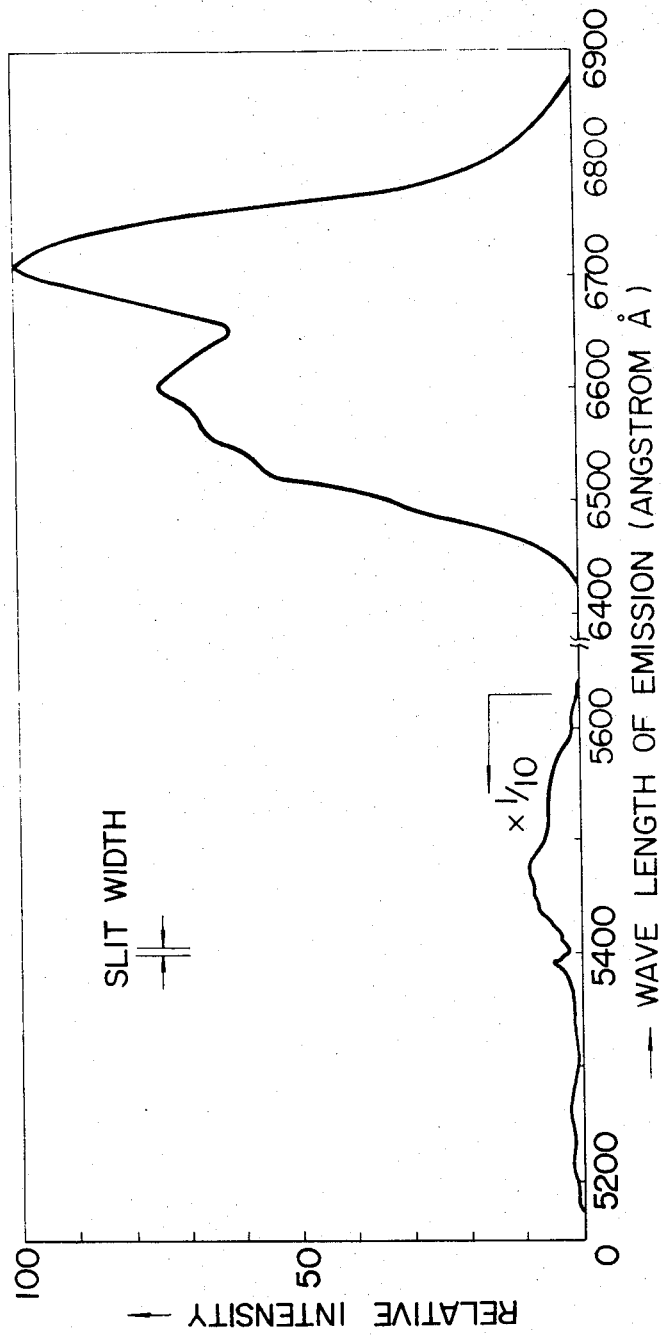

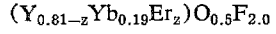
$(Y_{0.81-z}Yb_{0.19}Er_z)O_{0.5}F_{2.0}$ in order to prescribe that concentration of Er which is excellent in the red light-emitting intensity;

FIG. 6 is a diagram of curves of the emission spectra of a phosphor of the present invention that has a composition of $(Gd_{0.80}Yb_{0.19}Er_{0.01})O_{0.5}F_{2.0}$; and FIG. 7 is a diagram of the curve of the emission spectra of a phosphor of the present invention that has a composition of $(La_{0.2}Gd_{0.2}Y_{0.2}Lu_{0.2}Yb_{0.19}Er_{0.01})O_{0.5}F_{2.0}$.

DESCRIPTION OF THE PREFERRED EMBODIMENTS

The present invention will now be described in detail and by way of example in connection with a phosphor having yttrium oxyfluoride as a matrix.

Figure 1:
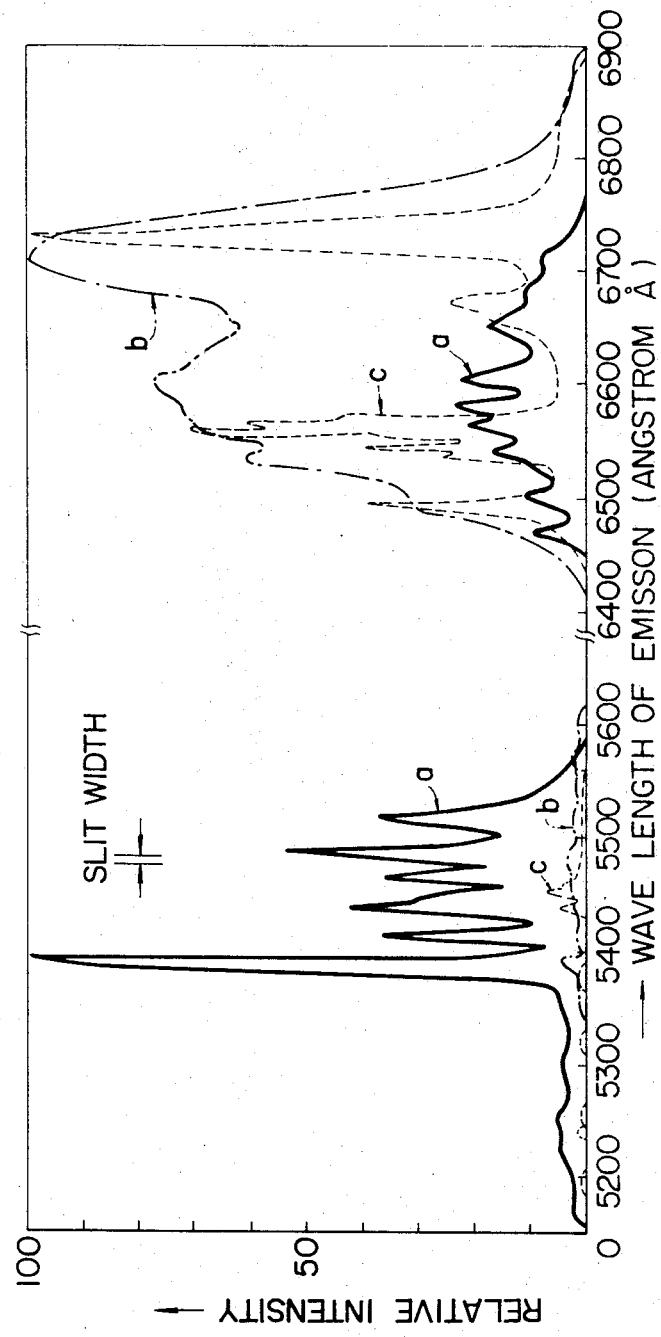

The phosphor $(Y_{0.8}Yb_{0.19}Er_{0.01})O_{0.55}F_{1.9}$ obtained under the optimum conditions exhibits an emission spectrum as shown by curve $b$ in FIG. 1 due to excitation of infrared radiation having wavelengths of 900 m$\mu$ to 1$\mu$, and is somewhat different from the prior art rare earth phosphors in that the emission spectrum resembles a broad band spectrum rather than a sharp one that is peculiar to the rare earth. When the value of $x$ is varied in the general formula of $(Y_{0.80}Yb_{0.19}Er_{0.01})O_{x/2}F_{3-x}$ the emission spectrum scarcely differs within the range of $$4 \leq x \leq 1.6$$

from the case of $x=1.1$ as shown in the curve $b$.

For the sake of comparison, the emission spectrum in the case of a fluoride not oxidized $(Y_{0.8}Yb_{0.19}Er_{0.01})F_3$ ($x=0$) is shown in curve $a$, and that in the case of $x=2.0$ of excessive oxidation as falls outside the range of the present invention, $(Y_{0.8}Yb_{0.19}Er_{0.01})OF$ is indicated in curve $c$. Herein, the values of $x$ are those evaluated from the results of the chemical analyses of fluorine and cations is specimens.

As to specimens $(Y_{0.8}Yb_{0.19}Er_{0.01})O_{x/2}F_{3-x}$ the relationships between the intensities of red and green luminescences and $x$ are shown in curves $a$ and $b$ in FIG. 2, respectively. As apparent from the figure, a phosphor synthesized so as to fall in a composition within the range of $$0.4 \leq x \leq 1.3$$

is excellent in the red light-emitting intensity. In this range, as apparent from the curve $b$ in FIG. 1, the intensity of the green emission is merely in the order of several percent of that of the red emission. Therefore, the phosphor of the present invention is also excellent in the color tone.

When the concentration of Yb is varied in the composition of $(Y_{1-y}Yb_yEr_{0.01})O_{0.5}F_2$, changes appear in the luminescent efficiency and the emission spectrum. The color of orange is exhibited at low concentrations of Yb, and the tinge of red is increased with increase in the concentration of Yb. The states of the changes are illustrated in curves $a$ and $b$ in FIG. 3, while the relationships between the intensities of the red and green luminescences and the concentration of Yb are shown in FIG. 4. The specimen of curve $a$ in FIG. 3 has the composition of $Y_{0.90}Yb_{0.09}Er_{0.01}O_{0.5}F_{2.0}$, that of curve $b$ in the same figure $(Yb_{0.99} Er_{0.01})O_{0.5}F_{2.0}$, and those of curves in FIG. 4 $(Y_{0.99-y}Yb_yEr_{0.01})O_{0.5}F_{2.0}$. The curve $a$ (black circles) in FIG. 4 represents the red light-emitting intensity, while the curve $b$ (white circles) the green light-emitting intensity. From the above results, the values of $y$ that are excellent in the red luminescence fall within the range of $$0.06 \leq y \leq 0.35$$

The relationship between the intensity of red luminescence and the concentration of Er in the compositions of $(Y_{0.81-z}Yb_{0.9}Er_z)O_{0.5}F_{2.0}$ is shown in FIG. 5. The preferable range of $z$ is $$0.008 \leq z \leq 0.10$$

In this range, the intensity of green luminescence is much lower than that of red luminescence, and is far from changing the color tone.

Within the suitable ranges of $x$, $y$ and $z$ described above, the phosphor is moisture-proof and is not deteriorated even when caused to stand in an atmosphere of high humidity for a long period of time.

Methods for producing the phosphor of the present invention will be hereinbelow explained in conjunction with the following examples.

Example 1

Method for producing $(Y_{0.80}Yb_{0.19}Er_{0.01})O_{0.5}F_{2.0}$: 4.280 g. of $Y_2O_3$, 1.775 g. of $Yb_2O_3$, 0.0908 g. of $Er_2O_3$, 2.763 g. of $YF_3$, 1,037 g. of $YbF_3$ and 0.0531 g. of $ErF_3$ were weighed as starting materials, and were mixed well. Previously, ammonium bifluoride $NH_4F \cdot HF$ amounting to 20% by weight based on the above mixture or 2.00 g. was packed in the bottom of a platinum crucible, of the suitable shape, and a sheet of platinum was placed thereon so as to prevent $NH_4F \cdot HF$ from being directly contacted with the mixture. The mixture was filled on the platinum sheet, and thereafter, a dense lid was covered thereon. The mixture was sintered in pure argon (Ar) gas at 1,100° C. for five hours. Then, a phosphor was obtained which had the spectral curve shown at curve $b$ in FIG. 1.

Example 2

In this example, 0.0291 g. of $YF_3$, 0.0117 g. of $YbF_3$ and 0.0006 g. of $ErF_3$ were well mixed with 0.019 g. of $AlF_3$ and 0.034 g. of $NH_4F \cdot HF$. The mixture was packed in a boat-shaped crucible and sintered in an argon (Ar) gas flow (flow rate:500 cc./min.) containing $10^{-2}$ mole percent of oxygen, at 1,100° C. for 5 hours. Then, there was obtained an infrared-stimulable, red visible light-emitting luminescent material having substantially the same characteristics as in Example 1.

Example 3

Method for producing $(Y_{0.80}Yb_{0.19}Er_{0.01})O_{0.5}F_{2.0}$: 4.603 g. of $Y_2O_3$, 1.909 g. of $Yb_2O_3$, 0.09676 g. of $Er_2O_3$, 2.431 g. of $YF_3$, 0.911 g. of $YbF_3$ and 0.0467 g. of $ErF_3$ were weighed as starting materials, and were mixed well.

The mixture was subjected to synthesis by following the procedures of Example 1. Then, there was obtained an infrared-stimulable, red visible light-emitting phosphor having almost the same spectra as curve $b$ in FIG. 1.

Example 4

Method for producing $(Y_{0.80}Yb_{0.19}Er_{0.01})O_{0.35}F_{2.3}$: 2.660 g. of $Y_2O_3$, 1.103 g. of $Yb_2O_3$, 0.0566 g. of $Er_2O_3$, 4.433 g. of $YF_3$, 1.580 g. of $YbF_3$ and 0.0810 g. of $ErF_3$ were weighed as starting materials, and were mixed well.

The subsequent operations for synthesis were made in the same manner as in Example 1. An infrared-stimulable, red visible light-emitting luminescent material thus obtained, exhibited substantially the same spectra as curve $b$ in FIG. 1.

Example 5

Method for producing $(Yb_{0.99}Er_{0.01})O_{0.5}F_{2.0}$: 6.253 g. of $Yb_2O_3$, 0.0614 g. of $Er_2O_3$, 3.649 g. of $YbF_3$ and 0.035 g. of $ErF_3$ were weighed as starting materials, and were mixed well.

Synthesis was carried out such that the subsequent operations were made in quite the same manner as in Example 1. There was obtained an infrared-stimulable, red visible light-emitting phosphor whose luminescent intensity characteristics were equivalent to curve $b$ in FIG. 3.

Example 6

Method for producing $(Y_{0.9}Yb_{0.09}Er_{0.01})O_{0.5}F_{2.0}$: 5.122 g. of $Y_2O_3$, 0.895 g. of $Yb_2O_3$, 0.0966 g. of $Er_2O_3$, 3.310 g. of $YF_3$, 0.522 g. of $YbF_3$ and 0.0565 g. of $ErF_3$ were weighed as starting materials, and were mixed well.

Synthesis was carried out such that the subsequent operations were made in quite the same manner as in Example 1. There was obtained an infrared-stimulable, red visible light-emitting phosphor whose luminescent intensity characteristics were equivalent to curve *a* in FIG. 3.

Example 7

Method for producing $(La_{0.8}Yb_{0.19}Er_{0.01})O_{0.5}F_{2.0}$: 4.809 g. of $La_2O_3$, 1.382 g. of $Yb_2O_3$, 0.0707 g. of $Er_2O_3$, 2.891 g. of $LaF_3$, 0.806 g. of $YbF_3$ and 0.0413 g. of $ErF_3$ were weighed as starting materials, and were mixed well. The subsequent operations for synthesis were made in quite the same manner as in Example 1. An infrared-stimulable, red visible light-emitting phosphor was obtained which had nearly the same spectra as curve *b* in FIG. 1.

Example 8

Method for producing $(Gd_{0.8}Yb_{0.19}Er_{0.01})O_{0.5}F_{2.0}$: 4.947 g. of $Gd_2O_3$, 1.278 g. of $Yb_2O_3$, 0.0653 g. of $Er_2O_3$, 2.924 g. of $GdF_3$, 0.746 g. of $YbF_3$ and 0.0382 g. of $ErF_3$ were weighed as starting materials, and were mixed well. With the subsequent operations made in quite the same manner as those of Example 1, synthesis was performed. Then, there was obtained an infrared-stimulable, red visible light-emitting phosphor which exhibited the spectral curve in FIG. 6.

Example 9

Method for producing $(Lu_{0.8}Yb_{0.19}Er_{0.01})O_{0.5}F_{2.0}$: 5.065 g. of $Lu_2O_3$, 1.192 g. of $Yb_2O_3$, 0.0608 g. of $Er_2O_3$, 2.953 g. of $LuF_3$, 0.695 g. of $YbF_3$ and 0.0356 g. of $ErF_3$ were weighed as starting materials, and were mixed well. The subsequent operations were conducted in quite the same manner as in Example 1, and an infrared-stimulable, red visible light-emitting phosphor having substantially the same spectra as curve *b* in FIG. 1 was obtained.

Example 10

Method for producing $(La_{0.4}Gd_{0.4}Yb_{0.19}Er_{0.01})O_{0.5}F_{2.0}$: 2.310 g. of $La_2O_3$, 2.571 g. of $Gd_2O_3$, 1.328 g. of $Yb_2O_3$, 0.0679 g. of $Er_2O_3$, 1,390 g. of $LaF_3$, 1.519 g. of $GdF_3$, 0.775 g. of $YbF_3$ and 0.0397 g. of $ErF_3$ were weighed as starting materials and were mixed well. With the subsequent operations made in quite the same manner as in Example 1, synthesis was carried out. Then, there was obtained an infrared-stimulable, red light-emitting phosphor which exhibited substantially the same spectra as curve *b* in FIG. 1.

Example 11

Method for producing $(Gd_{0.4}Y_{0.4}Yb_{0.19}Er_{0.01})O_{0.5}F_{2.0}$: 2.878 g. of $Gd_2O_3$, 1.792 g. of $Y_2O_3$, 1.487 g. of $Yb_2O_3$, 0.0760 g. of $Er_2O_3$, 1.701 g. of $GdF_3$, 1.157 g. of $YF_3$, 0.867 g. of $YbF_3$ and 0.0445 g. of $ErF_3$ were weighed as starting materials and were mixed well. The mixture was subjected to synthesis such that the subsequent operations were made in a manner similar to those of Example 1. An infrared-stimulable, red light-emitting fluorescent material thus obtained, had nearly the same spectra as curve *b* in FIG. 1.

Example 12

Method for producing $(Y_{0.4}Lu_{0.4}Yb_{0.19}Er_{0.01})O_{0.5}F_{2.0}$: 1.719 g. of $Y_2O_3$, 3.031 g. of $Lu_2O_3$, 1.426 g. of $Yb_2O_3$, 0.0729 g. of $Er_2O_3$, 1.110 g. of $YF_3$, 1.767 g. of $LuF_3$, 0.832 g. of $YbF_3$ and 0.0426 g. of $ErF_3$ were weighed as starting materials and were mixed well. Synthesis was carried out such that the subsequent operations were made in quite the same manner as in Example 1, and an infrared-stimulable, red visible light-emitting phosphor was obtained which exhibited substantially the same spectra as curve *b* in FIG. 1.

Example 13

Method for producing $(La_{0.267}Gd_{0.267}Y_{0.267}Yb_{0.19}Er_{0.01})O_{0.5}F_{2.0}$:

1.682 g. of $La_2O_3$, 1.872 g. of $Gd_2O_3$, 1.165 g. of $Y_2O_3$, 1.450 g. of $Yb_2O_3$, 0.0741 g. of $Er_2O_3$, 1.011 g. of $LaF_3$, 1.105 g. of $GdF_3$, 0.753 g. of $YF_3$, 0.846 g. of $YbF_3$ and 0.0434 g. of $ErF_3$ were weighed as starting materials and were mixed well. With the subsequent operations made in quite the same manner as in Example 1, synthesis was carried out. Then, there was obtained an infrared-stimulable, red visible light-emitting phosphor which had nearly the same spectra as curve *b* in FIG. 1.

Example 14

Method for producing $(La_{0.267}Gd_{0.267}Lu_{0.267}Yb_{0.19}Er_{0.01})O_{0.5}F_{2.0}$:

1.484 g. of $La_2O_3$, 1.652 g. $Gd_2O_3$, 1.812 g. of $Lu_2O_3$, 1.279 g. of $Yb_2O_3$, 0.0654 g. of $Er_2O_3$, 0.892 g. of $LaF_3$, 0.975 g. of $GdF_3$, 1.057 g. of $LuF_3$, 0.746 g. of $YbF_3$ and 0.0383 g. of $ErF_3$ were weighed as starting materials and were mixed well. With the subsequent operations made in quite the same manner as in Example 1, synthesis was carried out. Then, there was obtained an infrared-stimulable, red visible light-emitting phosphor which had nearly the same spectra as curve *b* in FIG. 1.

Example 15

Method for producing $(Y_{0.2}La_{0.2}Gd_{0.2}Lu_{0.2}Yb_{0.19}Er_{0.01})O_{0.5}F_{2.0}$:

0.828 g. of $Y_2O_3$, 1.197 g. of $La_2O_3$, 1.331 g. of $Gd_2O_3$, 1.461 g. of $Lu_2O_3$, 1.375 g. of $Yb_2O_3$, 0.0703 g. of $Er_2O_3$, 0.534 g. of $YF_3$, 0.720 g. of $LaF_3$, 0.788 g. of $GdF_3$, 0.852 g. of $LuF_3$, 0.802 g. of $YbF_3$ and 0.411 g. of $ErF_3$ were weighed as starting materials and were mixed well. By following subsequent operations of Example 1, synthesis was carried out. Then, there was obtained an infrared-stimulable, red visible light-emitting fluorescent material which had spectral curves as shown in FIG. 7.

What is claimed is:

1. A luminescent material consisting essentially of a composition represented by the following general formula:

$$(Ln_{1-y-z}Yb_yEr_z)O_{x/2}F_{3-x}$$

where Ln is at least one element selected from the group consisting of lanthanum, gadolinium, yttrium and lutetium, and where $x$, $y$ and $z$ are $0.4 \leq x \leq 1.3$, $$0.06 \leq y \leq 0.35$$

and $0.008 \leq z \leq 0.10$, respectively.

2. The luminescent material of claim 1 in which Ln is lanthanum.

3. The luminescent material of claim 1 in which Ln is gadolinium.

4. The luminescent material of claim 1 in which Ln is yttrium.

5. The luminescent material of claim 1 in which Ln is lutetium.

6. A method for producing a luminescent material comprising the steps of:
   (1) preparing a mixture of 0.06 to 0.35 mole of ytterbium fluoride, 0.008 to 0.10 mole of erbium fluoride and the balance being at least one rare earth fluoride selected from the group consisting of lanthanum fluoride, gadolinium fluoride, yttrium fluoride and lutetium fluoride, so as to be 1 mole in the sum of the mole number thereof,
   (2) adding 2 to 50 percent by weight of a fluoride flux containing ammonium bifluoride ($NH_4F \cdot HF$), the percentage being based on said mixture, and
   (3) sintering the mixture thus obtained in a crucible in which a mixture gas consisting of an inert gas and $10^{-4}$ to $10^{-1}$ percent by mole of oxygen gas, based on said inert gas, is caused to flow at a flow rate of 100 to 500 ml. per minute, for a period of time of about 1.5 to about 5 hours at 1,000 to 1,200° C.

7. The method for producing a luminescent material of claim 6 in which said inert gas is a gas selected from the group consisting of nitrogen and argon.

8. The method for producing a luminescent material of claim 6 in which said fluoride flux consists of a mixture of ammonium bifluoride and a fluoride selected from the group consisting of aluminum fluoride, beryllium fluoride and lead fluoride.

9. A method for producing a luminescent material comprising the steps of:
(1) preparing a first mixture of 0.06 to 0.35 mole of ytterbium fluoride, 0.008 to 0.10 mole of erbium fluoride and the balance being at least one rare earth fluoride selected from the group consisting of lanthanum fluoride, gadolinium fluoride, yttrium fluoride and lutetium fluoride, so as to be 1 mole in the sum of the mole number thereof,
(2) preparing a second mixture of rare earth oxides containing 0.06 to 0.35 mole of ytterbium, 0.008 to 0.10 mole of erbium and the balance being at least one element selected from the group consisting of lanthanum, gadolinium, yttrium and lutetium, so as to be 1 mole in the sum of these elements,
(3) mixing said first and second mixtures, the mole ratio of said first mixture by said second mixture being 0.5 to 3.0, and
(4) sintering the mixture thus obtained to a covered crucible in which 2 to 50 percent by weight of ammonium bifluoride (NH$_4$F·HF), based on said mixture, is placed in its bottom and said mixture is then placed above said ammonium bifluoride in a manner to be separated therefrom, for a period of time of about 3 to about 8 hours in an inert gas atmosphere at 1,000 to 1,250° C.

10. The method for producing a luminescent material of claim 9 in which the mixture obtained for the sintering is sintered at 1,100 to 1,200° C.

11. The method for producing a luminescent material of claim 9 in which the inert gas is a gas selected from the group consisting of nitrogen and argon.

12. The method for producing a luminescent material of claim 9 in which said ammonium bifluoride (NH$_4$F·HF)

amounts to about 10 to about 20 percent by weight based on the mixture obtained for the sintering.

References Cited
UNITED STATES PATENTS
3,541,018  11/1970  Hewes et al. ____ 252—301.4 H
3,621,340  11/1971  Singh et al. _____ 252—301.4 H OSCAR R. VERTIZ, Primary Examiner
J. COOPER, Assistant Examiner